(12) United States Patent
Heine et al.

(10) Patent No.: US 12,529,944 B2
(45) Date of Patent: Jan. 20, 2026

(54) ADAPTER SYSTEM FOR FASTENING ACCESSORY PARTS TO A HOT SHOE

(71) Applicant: Sennheiser electronic SE & Co. KG, Wedemark (DE)

(72) Inventors: Lars Heine, Schwülper (DE); Tobias von Allwörden, Aumühle (DE); Jörg-Peter Thormann, Stadthagen (DE); Ralf Kittmann, Zürich (CH); Stefan Buckmann, Burgdorf (DE); Hjördis Haaker, Hannover (DE); Dirk Engelking, Isernhagen (DE)

(73) Assignee: Sennheiser electronic SE & Co. KG, Wedemark (DE)

( * ) Notice: Subject to any disclaimer, the term of this patent is extended or adjusted under 35 U.S.C. 154(b) by 220 days.

(21) Appl. No.: 18/532,185

(22) Filed: Dec. 7, 2023

(65) Prior Publication Data

US 2024/0210800 A1 Jun. 27, 2024

(30) Foreign Application Priority Data

Dec. 27, 2022 (DE) .......................... 102022134811.3

(51) Int. Cl.
| | | |
|---|---|---|
| G03B 17/56 | (2021.01) | |
| F16M 11/04 | (2006.01) | |
| G03B 31/00 | (2021.01) | |

(52) U.S. Cl.
CPC ........... *G03B 17/566* (2013.01); *G03B 31/00* (2013.01); *F16M 11/041* (2013.01); *G03B 2217/002* (2013.01)

(58) Field of Classification Search
CPC ...................... G03B 17/56–566; F16M 11/041
See application file for complete search history.

(56) References Cited

U.S. PATENT DOCUMENTS

| | | | | |
|---|---|---|---|---|
| 4,474,439 A | * | 10/1984 | Brown | F16M 11/08 |
| | | | | 396/428 |
| 7,740,499 B1 | * | 6/2010 | Willey | F41H 1/04 |
| | | | | 439/333 |

(Continued)

FOREIGN PATENT DOCUMENTS

| | | | |
|---|---|---|---|
| CN | 208421492 U | * | 1/2019 |
| CN | 209313462 U | * | 8/2019 |

(Continued)

OTHER PUBLICATIONS

Smallrig 1598 product page at https://www.smallrig.com/smallrig-mounting-cheese-plate-1598.html retrieved Sep. 25, 2025 (Year: 2025).*

(Continued)

*Primary Examiner* — Leon W Rhodes, Jr.
(74) *Attorney, Agent, or Firm* — Jon E. Gordon; Haug Partners LLP

(57) ABSTRACT

A hot-shoe adapter system is provided for fastening accessory parts to a hot shoe. The hot-shoe adapter system has a hot-shoe adapter with a first side for fastening in a hot shoe and a second side, and an adapter plate, which has a plurality of first holes for fastening the hot-shoe adapter, a plurality of second holes for fastening the second side of the hot-shoe adapter, four corners each with a third hole and at least one magnetic element in the region of the third holes.

10 Claims, 14 Drawing Sheets

(56) References Cited

U.S. PATENT DOCUMENTS

| | | | |
|---|---|---|---|
| 7,753,599 B2* | 7/2010 | Segawa | F16M 13/04 |
| | | | D16/237 |
| 10,795,243 B1 | 10/2020 | Sielen | |
| 11,131,424 B2* | 9/2021 | Olinger | F16M 11/08 |
| 11,516,568 B1 | 11/2022 | Kung et al. | |
| 2010/0135506 A1 | 6/2010 | Rosen | |
| 2011/0069472 A1 | 3/2011 | Peregrine et al. | |
| 2011/0119409 A1 | 5/2011 | King | |
| 2013/0028586 A1 | 1/2013 | Ide et al. | |
| 2015/0215483 A1* | 7/2015 | Farnsworth | H04N 1/00557 |
| | | | 348/375 |
| 2018/0109765 A1* | 4/2018 | Wu | G03B 31/00 |
| 2020/0096843 A1* | 3/2020 | Linney | A63C 17/0006 |
| 2022/0137491 A1* | 5/2022 | Stankie | H04M 1/724092 |
| | | | 396/428 |

FOREIGN PATENT DOCUMENTS

| | | | |
|---|---|---|---|
| CN | 217843253 U * | 11/2022 | |
| DE | 21 2009 000 176 U1 | 4/2012 | |
| FR | 3 021 179 B3 | 5/2016 | |
| KR | 20120118743 A * | 10/2012 | F16M 11/04 |

OTHER PUBLICATIONS

Search Report dated Aug. 29, 2023 issue in the corresponding German application No. 10 2022 134 811.3.
Kinematische magnetische Montageplatten; Edmund Optics, Apr. 17, 2020, XP093158565, online Gefunden im Internet: URL: https://www.edmundoptics.com/f/kinematic-magentic-base-plates/39923/ [gefunden am May 2, 2024].
Search Report dated May 28, 2024 issued in corresponding European application No. EP 23215905.3.

* cited by examiner

ADAPTER SYSTEM FOR FASTENING ACCESSORY PARTS TO A HOT SHOE

CROSS-REFERENCE TO RELATED APPLICATIONS

This application claims priority under 35 U.S.C. § 119 to German Patent Application No. 102022134811.3, filed Dec. 27, 2022, the entirety of which is herein incorporated by reference.

FIELD OF DISCLOSURE

The present invention relates to an adapter system for fastening accessory parts to a hot shoe.

BACKGROUND

In the semi-professional area of mobile video recording a plurality of components such as, for example, a wireless receiver for audio signals are attached to a video camera. This is typically accomplished on a hot shoe of a camera. Furthermore rigs and gimbal rigs are used for cameras. Such a rig is connected to the camera and wireless receivers and other components can then be fastened to the rig. Such components can, for example, be a monitor, a directional microphone, handles, power bank, audio recorder etc.

SUMMARY OF THE INVENTION

It is an object of the present invention to provide an improved scope for fastening accessory components for mobile use for audio and/or video recording.

This object is achieved by an adapter system according to Claim 1.

Thus, an adapter system for fastening accessory part to a hot shoe is provided. The adapter system comprises an adapter plate with a plurality of first holes, a plurality of second holes, four corners each having a third hole and at least one magnetic element in the area of the third holes.

According to a further aspect of the present invention, the adapter plate has a plurality of fourth holes.

According to a further aspect of the present invention, the adapter plate has four side surfaces and a plurality of first and second longitudinal holes in the area of the fourth side surfaces.

According to a further aspect of the present invention, the adapter plate has at least one hole in or on at least one of the side surfaces.

According to a further aspect of the present invention, the hot shoe adapter has at least two domes on its second side, whose external diameter is adapted to an internal diameter of the third holes so that the domes can be inserted into the third holes.

The invention also relates to an adapter plate for fastening accessory parts to a hot shoe. The adapter plate has a plurality of first holes, four corners each having a third hole and at least one magnetic element in the area of the third holes.

The invention also relates to a wireless audio receiver with a first and second side, a plurality of domes with magnetic elements on the second side and a plurality of recesses with magnetic elements on the first side.

According to one aspect of the present invention, the dimensions of the recesses are adapted to the dimensions of the domes.

The adapter plate can, for example, be fastened to a hot shoe of a camera. The adapter plate comprises a plate with a plurality of holes, countersunk holes and/or countersunk elongate holes.

Further configurations of the invention are the subject of the dependent claims.

BRIEF DESCRIPTION OF THE DRAWINGS

Advantages and exemplary embodiment of the invention are explained in detail hereinafter with reference to the drawings.

DETAILED DESCRIPTION

Figure 1:
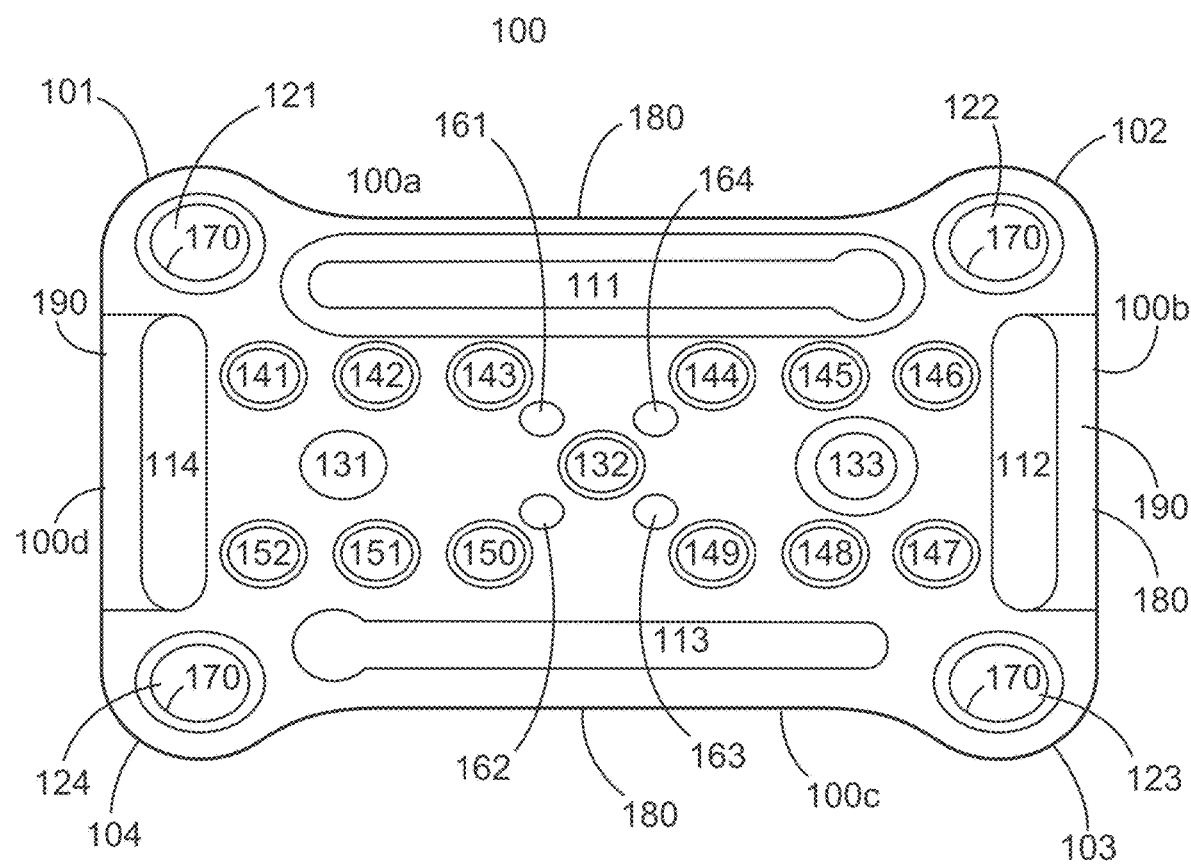
FIG. 1 shows a schematic plan view of an adapter plate according to a first exemplary embodiment, FIG. 2A to 2C each show various perspective views of an adapter plate and a hot-shoe adapter, FIGS. 3A and 3B each show a perspective view of an adapter plate, a hot-shoe, adapter and two wireless receivers, FIGS. 4A and 4B each show a schematic and perspective view of a section of an adapter plate, a hot-shoe adapter and a wireless receiver according to a further exemplary embodiment of the invention, FIG. 5A to 5C each show a perspective view of a digital camera with an adapter plate as well as wireless receivers according to a further exemplary embodiment of the invention.

FIG. 1 shows a schematic plan view of an adapter plate according to a first exemplary embodiment. The adapter plate 100 can be configured as a plate with a plurality of holes or countersunk holes as well as elongate holes or countersunk elongate holes. The plate 100 can optionally have a substantially rectangular basic shape. The plate 100 can have four corners 101, 102, 103, 104 as well as four sides 100a, 100b, 100c, 100d, two long sides 100a, 100c and two short sides 100b, 100d. In the area of the respective corners 101-104 countersunk holes 121, 122, 123, 124 can be provided. In the area of the countersunk holes 121-124 threads such as tripod sockets can be provided. Alternatively or additionally in the area of the countersunk holes 121-124 ferromagnetic elements or magnets 170 can be provided. The ferromagnetic elements or magnets 170 can be arranged in the countersunk holes 121-124 so that respectively one recess remains with respect to the surface of the adapter plate 100.

Countersunk elongate holes 111, 112, 113, 114 can be provided along the side surfaces. On the two long sides 100a, 100c two first countersunk elongate holes 111, 113 can be provided and on the short sides 100b, 100d two second countersunk elongate holes 112, 114 can be provided.

Holes 180 (e.g. with threads 181) can be provided on the side surfaces. These holes 180 can serve to receive ends of a bracket.

On the short sides 100b, 100d recesses 190 can be provided so that the height of the plate on the side 100b, 100d is lower than the remainder of the plate.

Optionally three holes 131, 132, 133 can be provided along a central longitudinal axis of the adapter plate. In this case the second hole 132 is provided substantially in the centre of the adapter plate 100. Optionally twelve countersunk holes 141-152 can be provided parallel to the first countersunk elongate holes 111, 113, wherein six countersunk holes 141-146 are arranged next to the first countersunk elongate hole 111 and six countersunk holes 147-152 are arranged adjacent to the other countersunk elongate hole 113. Four countersunk holes 161-164 can be arranged around the central countersunk hole 132.

Optionally the holes 150, 162, 132, 164, 144 can be located along a straight line. Optionally the holes 143, 161, 132, 163, 149 can be located along a straight line. The holes 141, 142, 143, 144, 145, 146 can extend along a straight line. The holes 147, 148, 149, 150, 151, 152 can extend along a straight line and be arranged parallel to the holes 141-146. The holes 131, 132, 133 also extend along a straight line.

Figure 2A:
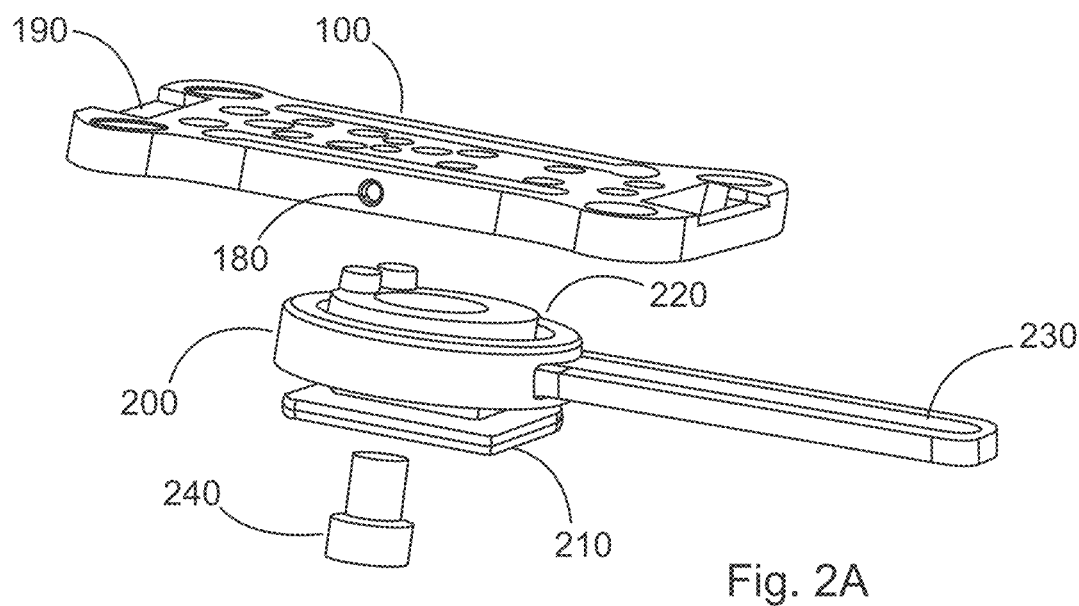
Figure 2B:
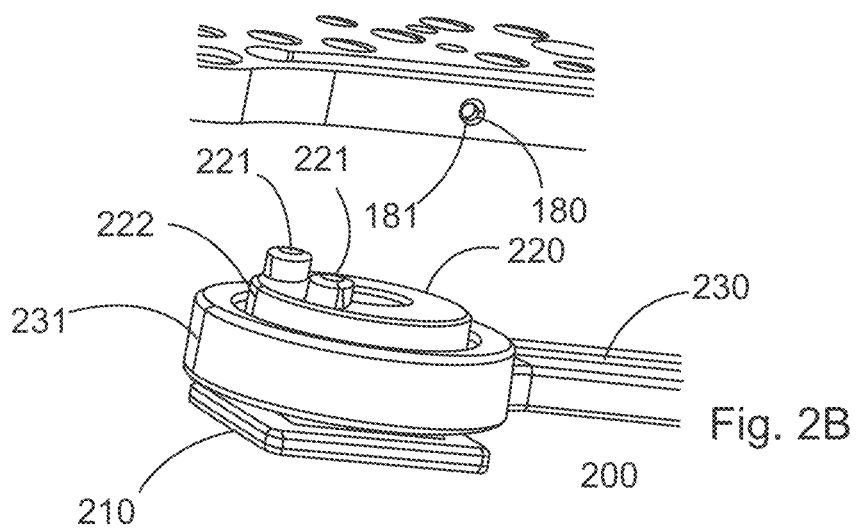
Figure 2C:
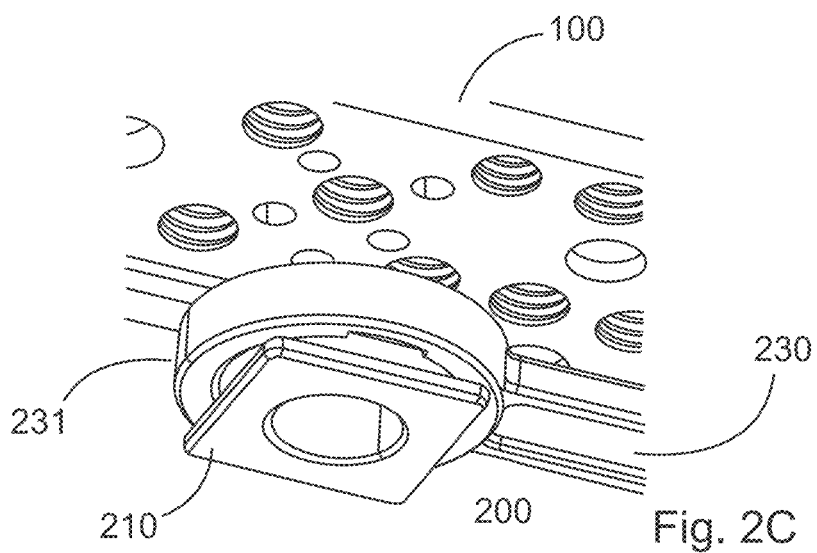

FIG. 2A to 2C each show various perspective views of an adapter plate as well as a hot-shoe adapter. The adapter plate 100 for example, from FIG. 1 can be fastened to a hot shoe of a video camera by means of a hot shoe adapter 200. The hot-shoe adapter 200 has an inner element 222 and a, for example, annular outer element 231. The inner element 222 has a first end 210 for mounting in a hot shoe and a second end 220 for mounting in or on the adapter plate 100. The first end 210 is configured to be rectangular and is suitable to be inserted into a hot shoe. The hot-shoe adapter 200 can then be tightly clamped on the hot shoe by means of the outer element 231 as described hereinafter.

Two projections or domes 221 can be provided, for example, at the second end 220. These two domes 221 can be introduced into the countersunk holes 161-164. Optionally a screw 240 can be provided to fasten the hot-shoe adapter to the adapter plate 100. Optionally the screw 240 can be screwed into the central countersunk hole 132 in order to fasten the hot-shoe adapter 200 to the adapter plate 100. The inner element 222 has an external thread (not shown). The outer element 231 has an internal thread (not shown), which is screwed onto the external thread of the inner element 222. Furthermore a lever or handle 230 is attached to the outer element 231 by means of which the outer element can be twisted with respect to the inner element 222 so that the outer element 231 on the thread changes its distance from the rectangular first end 210 of the inner element 222. In this way, a part of the hot shoe can be clamped between the rectangular first end 210 of the inner element 222 and the outer element 231 and thus a reliable fastening can be achieved. The lever 230 serves to perform the rotary movement of the outer element 231 required for tightly clamping since the outer element between the camera and the adapter plate 100 is difficult to reach with the fingers when the first end 210 is inserted into the hot shoe.

By inserting the two domes 221 into two of the four holes 161-164 and by fastening the hot-shoe adapter 200 to the adapter plate 100 by means of the screw 240, a positive and twist-proof fastening of the adapter plate on the hot-shoe adapter 200 is achieved. The countersunk holes 161-164 have an internal diameter which is matched to the external diameter of the domes 221. Optionally instead of the two domes 221, a single projection 221 can be provided to accomplished a positive and twist-proof fastening.

The material of the adapter plate 100 can be both metal and also plastic. If the adapter plate 100 is made of plastic, metallic internal threads can be provided in some of the countersunk holes, in particular the countersunk holes 131-133. In particular, the adapter plate can also be fastened directly to a rig by means of the countersunk holes 141-152 and the countersunk holes 131, 132 and 133 and optionally by means of the countersunk holes 121-124. Alternatively to this, the adapter plate can also be screwed to a magic arm, a joint adapter, a handle, a tripod head or tripod quick-release plates.

The thread between the inner element 222 and the outer element 231 can be designed with a steep pitch which has the result that it is possible to tightly clamp on the hot shoe without a complete rotation of the outer element 231. Optionally this can be accomplished by half a rotation. However, it is also possible that a complete rotation, a three-quarters rotation or a quarter rotation is sufficient for fastening. The thread between the inner element 222 and the outer element 231 can have a pitch in the range of 1.0 to 2.0 mm per revolution. A pitch of 1.5 mm per revolution is preferred which enables tight clamping by half a revolution. This is advantageous since the user can easily identify by means of the position of the lever 230 whether the hot-shoe adapter 200 is already tightly clamped or released for removal.

Figure 3A:
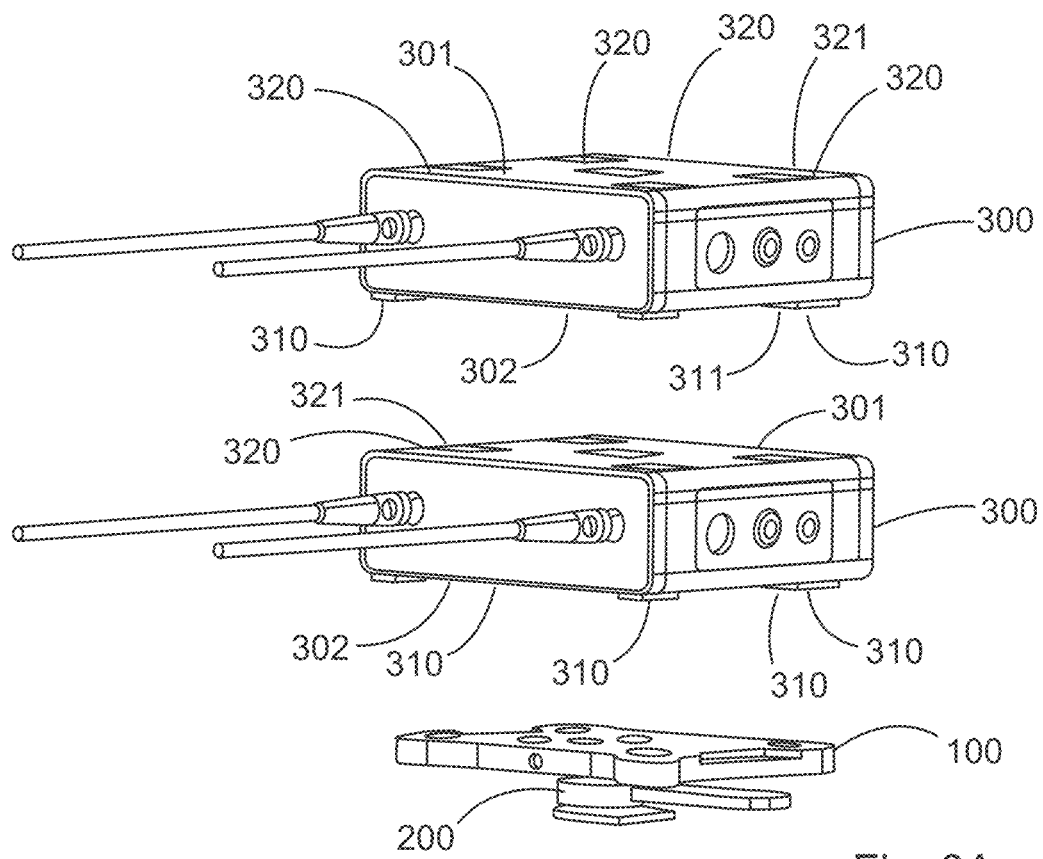
Figure 3B:
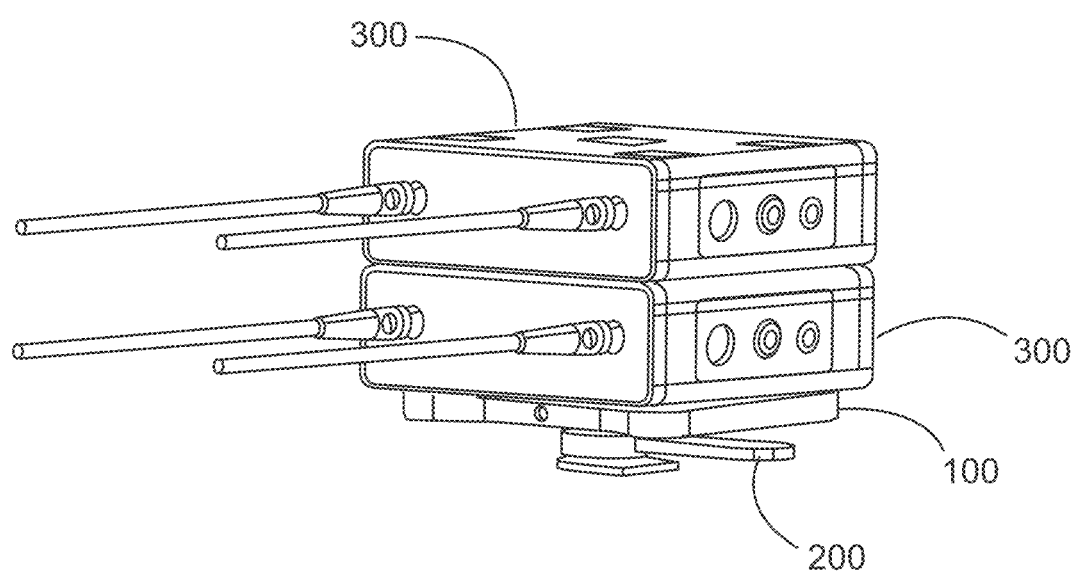

FIGS. 3A and 3B each show a perspective view of an adapter plate, of a hot-shoe adapter and two wireless receivers. The receivers 300 can, for example, have four recesses 320 on their upper side and four domes 310 on their underside 310. The domes 310 can be matched to the holes 121-124. The recesses in the adapter plate 100 which are located above the ferromagnetic elements or magnets 170 are adapted to the domes 310 so that the receiver 300 can be fastened magnetically in a mechanically fixed alignment on the adapter plate 100. The recesses 320 are also matched to the domes 310. Optionally a magnet 321 or a ferromagnetic element can be provided in the area of the recesses 320. Magnets and/or ferromagnetic elements 311 can also be provided in the area of the domes 310. Thus, one receiver 300 can be placed on the other, wherein the second receiver is held magnetically on the first receiver. Each individual receiver 300 can therefore either be attached magnetically directly to the adapter plate 100 or stacked on the upper side of another receiver 300. It may be necessary to use multiple receivers to implement a multichannel application.

Figure 4A:
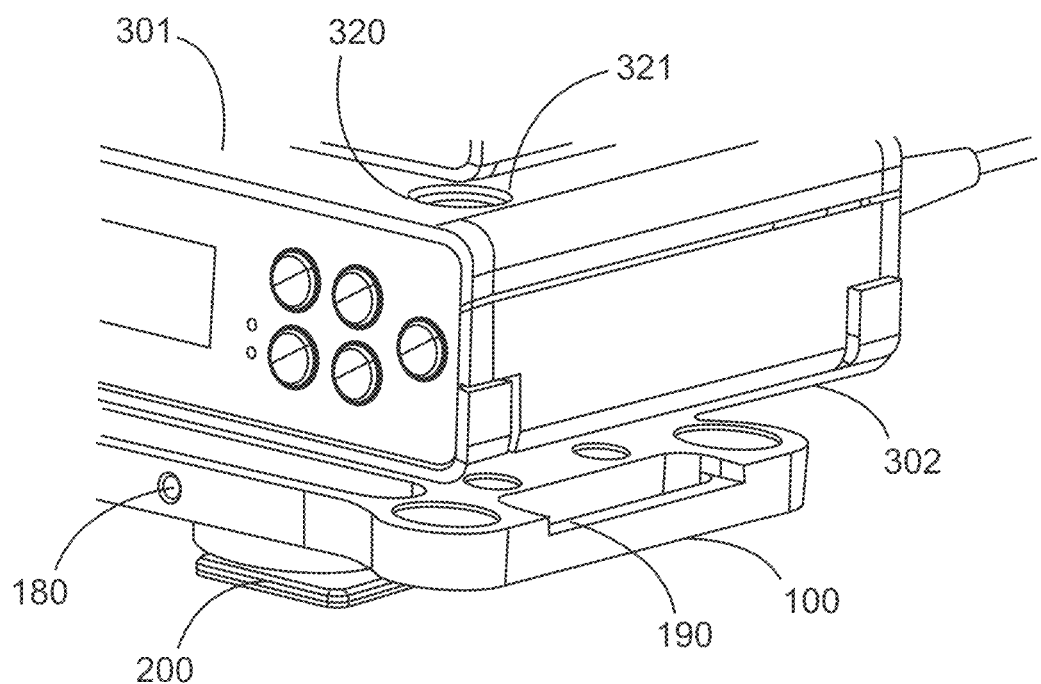
Figure 4B:
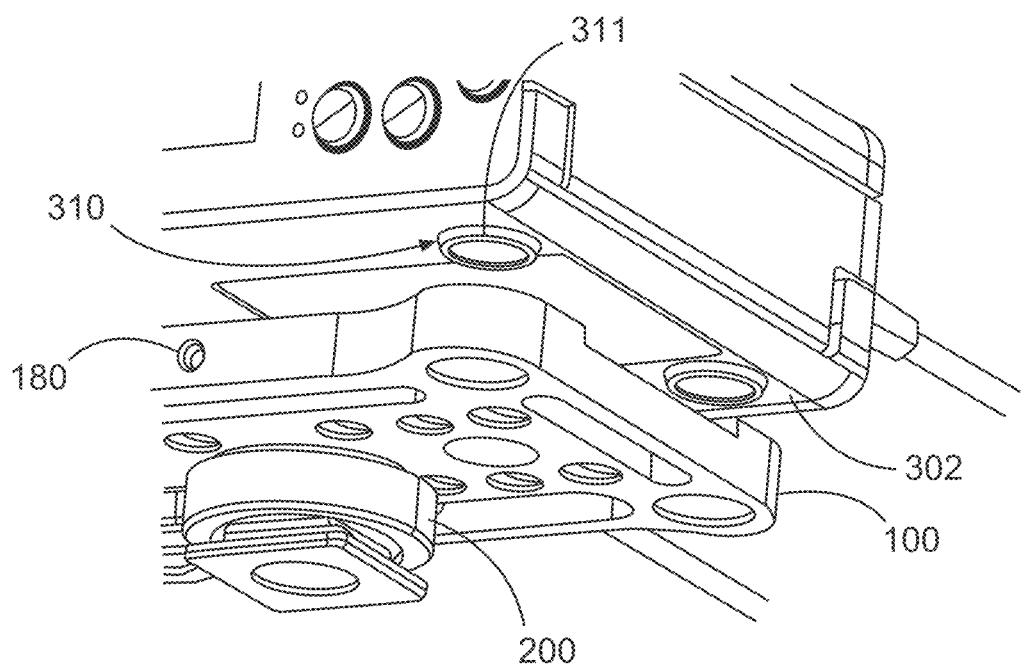

FIGS. 4A and 4B each show a schematic perspective view of a section of an adapter plate, a hot-shoe adapter and a wireless receiver according to a further exemplary embodiment of the invention. An accessory element 300 such as, for example, a wireless audio receiver 300, can, for example, have four domes 310 on its underside 302. The domes 310 can be provided in particular in the area of the corners of the underside 302 of the wireless receiver. The configuration of the domes 310 is such that they can fit into the countersunk holes 121-124. Optionally these domes 310 have magnetic elements 311. Optionally the adapter plate 100 can also have magnetic elements in the area of the countersunk holes 121-124 so that the receiver 300 is held magnetically in or on the adapter plate 100. Furthermore, a longitudinal or transverse displacement of the receiver in relation to the adapter plate can be avoided by the mechanical configuration of the domes which is matched to the internal diameter of the countersunk holes 121-124.

Optionally the wireless receiver can have four recesses 320 on its upper side 301 and in particular in the area of the corners, which each optionally have magnetic elements 321. The internal diameter of the recesses 320 is matched to the external diameter of the domes 310 so that a second wireless receiver 300 is placed on the first wireless receiver 300 and is held magnetically by means of the magnetic elements 311, 321. Thus, two receiver units 300 can easily be held on the adapter plate 300 (in particular held magnetically). This is advantageous because no further fastening of the receivers is required.

Alternatively to the embodiment shown in FIGS. 2 to 4, the adapter plate can also be fastened to a camera or a holding apparatus without the hot-shoe adapter 200.

Figure 5A:
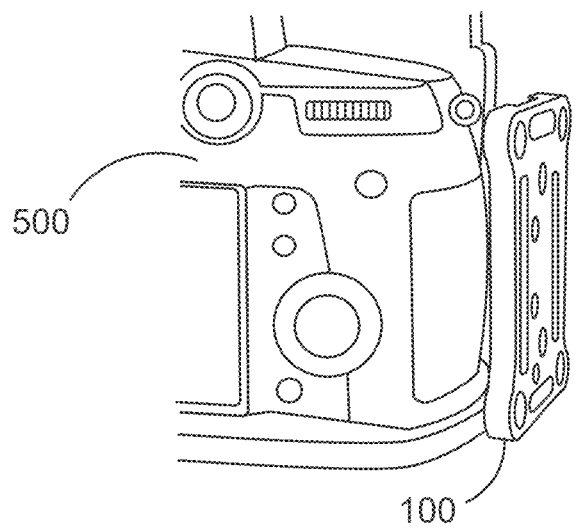
Figure 5B:
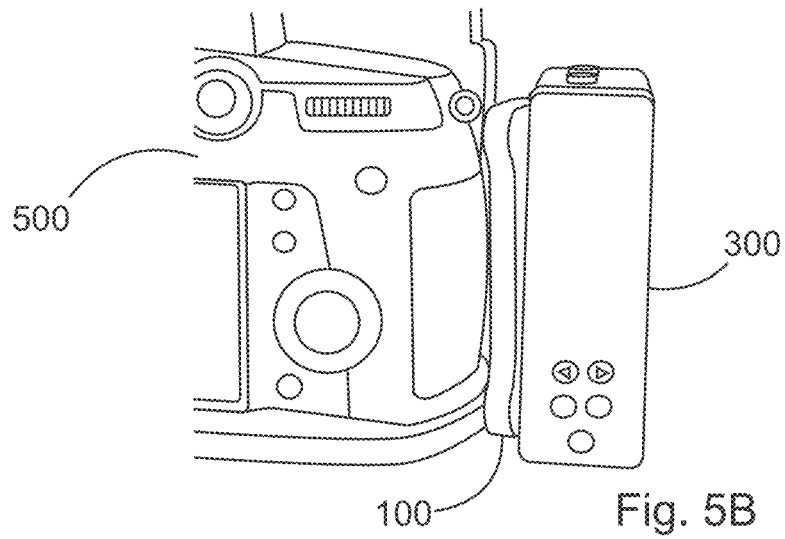
Figure 5C:
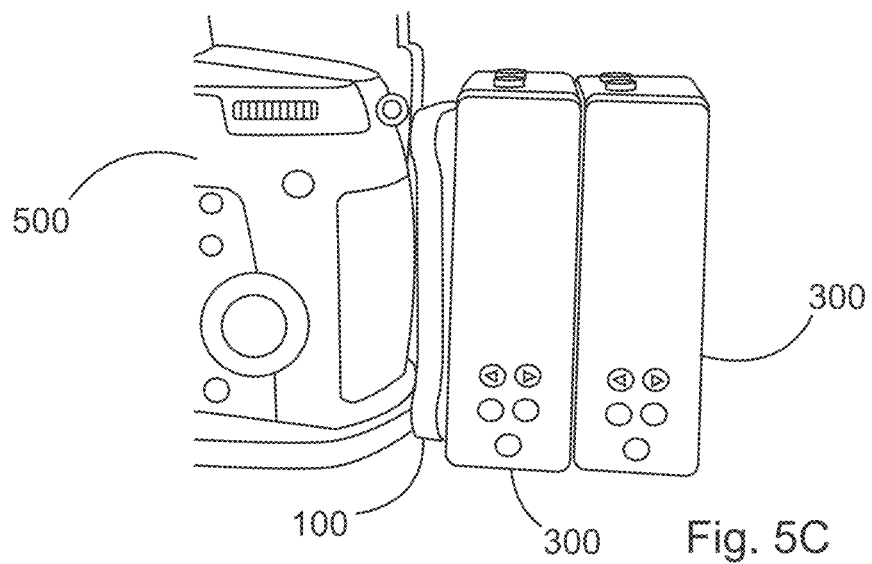

FIGS. 5A to 5C each show a perspective view of a digital camera 500 with an adapter plate 100 and wireless receivers according to a further exemplary embodiment of the invention. On the longitudinal sides and/or on the shorter sides holes 180 can optionally be provided with threads.

Thus, as shown in FIG. 5, an adapter plate 100 can be fastened to the side of a camera 500 or to a rig which is connected to the camera. Thus, receivers 300 can also be fastened to the side of the camera (as shown in FIGS. 5B and 5C).

Figure 6:
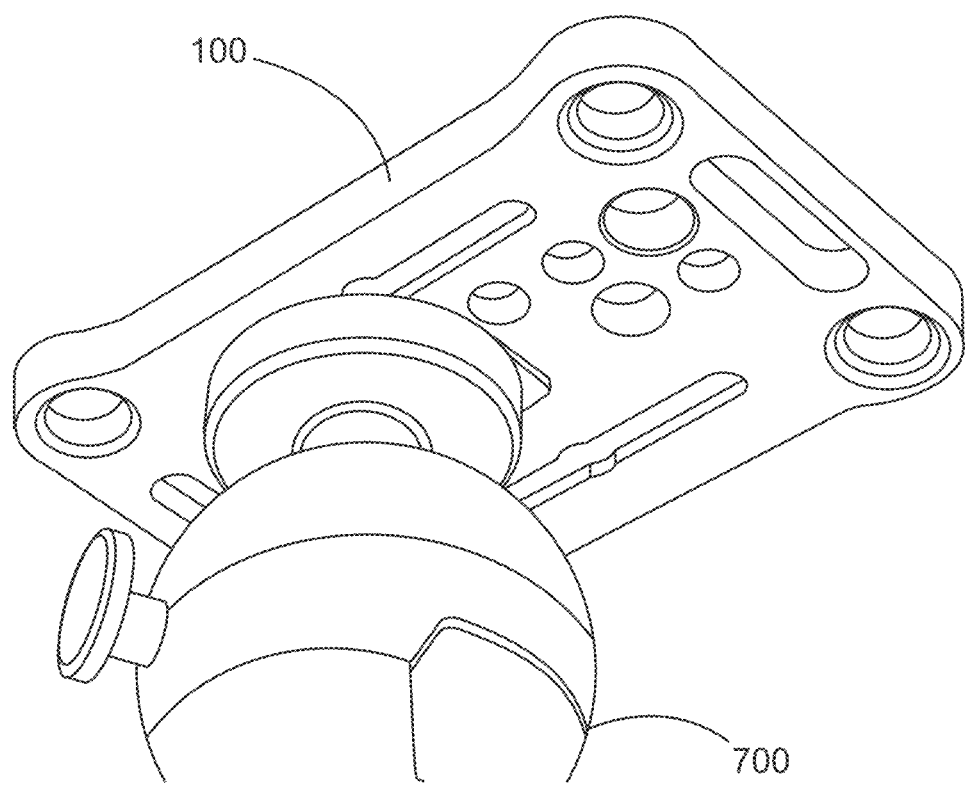
FIG. 6 shows a perspective view of a fastening of an adapter plate according to a further exemplary embodiment of the invention.

FIG. 6 shows a perspective view of a fastening of an adapter plate 100 according to a further exemplary embodiment of the invention. In FIG. 6 the adapter plate 100 is fastened to a swivel arm 700.

Figure 7:
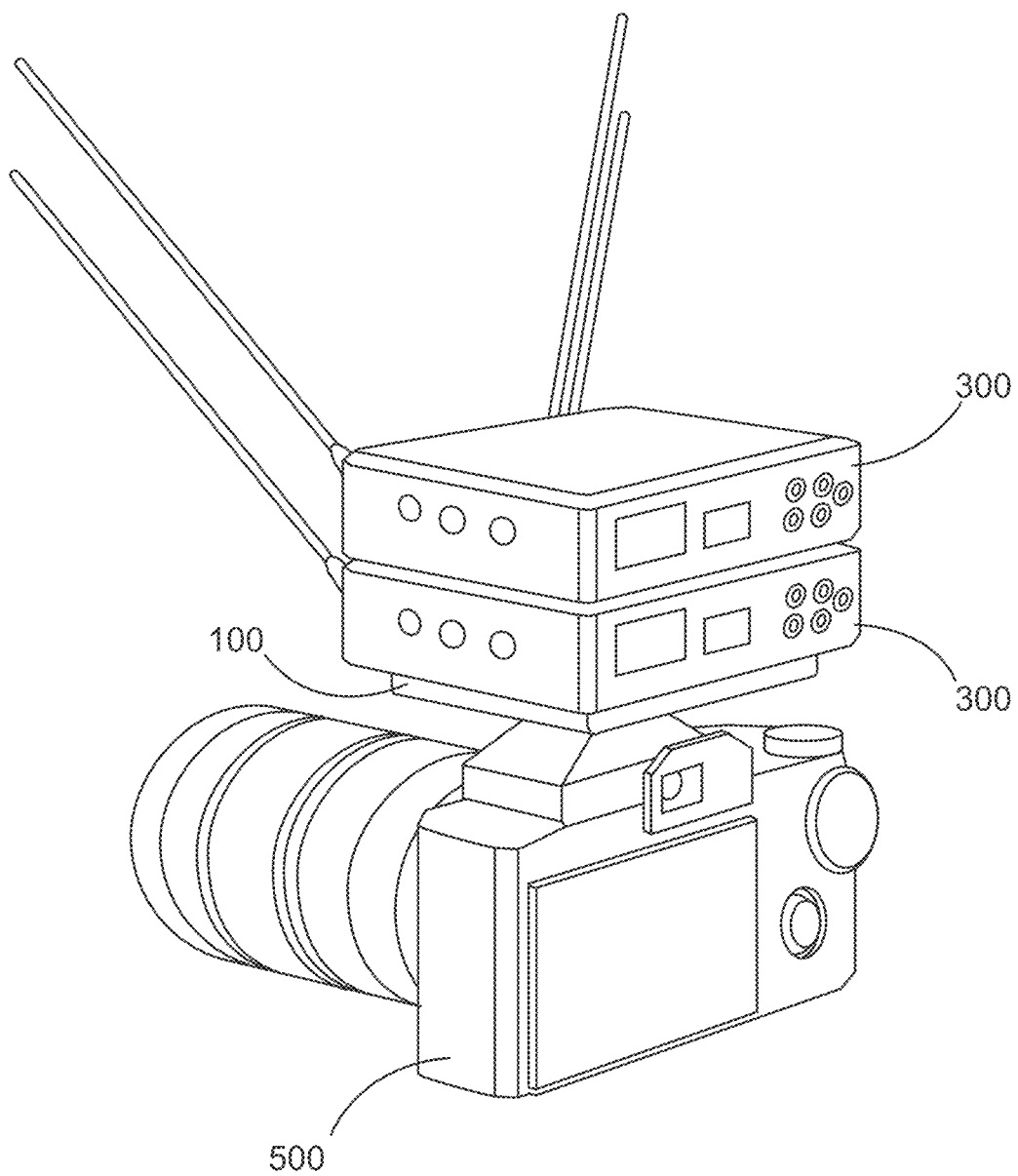
FIG. 7 shows a perspective view of a digital camera with two wireless receivers.

FIG. 7 shows a perspective view of a digital camera 500 with two wireless receivers 300. In FIG. 7 two receivers 300 (for example, as shown in FIGS. 3A and 3B) are placed one on top of the other. The lower receiver 300 is then placed on the adapter plate 100.

Figure 8:
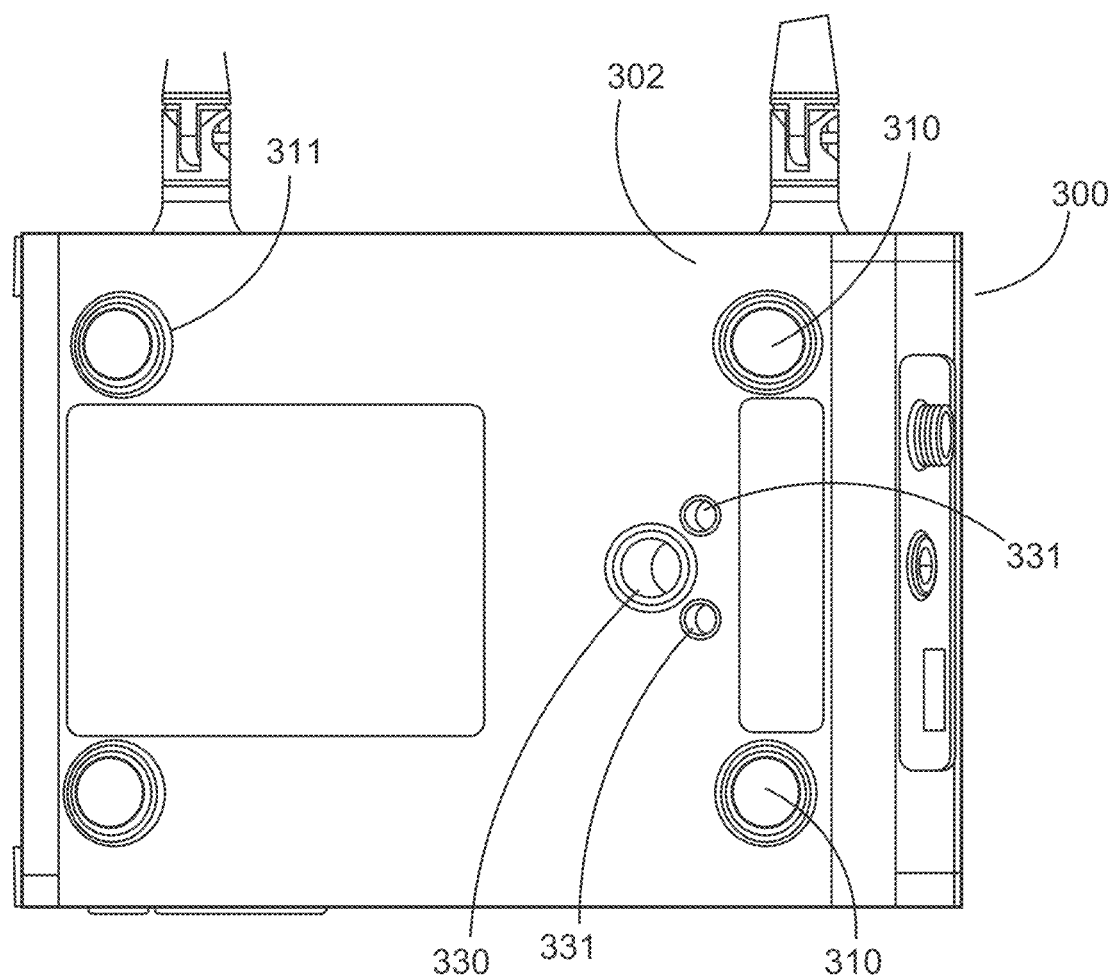
FIG. 8 shows an underside of a wireless audio receiver according to a further exemplary embodiment of the invention.

FIG. 8 shows an underside of a wireless audio receiver according to a further exemplary embodiment of the invention. In addition to the domes 310 which can each have a magnet unit 311, a tripod thread insert 330 can be provided in order to be able to place the receiver directly on a tripod thread. The tripod thread insert 330 can also be placed on the accessory element 300 in relation to the domes 310 so that it can be fixed with a screw through one of the holes 131, 132 and 133 on the adapter plate 100 when the domes 310 are positioned in the countersunk holes 121, 122, 123, 124 or the corresponding recesses above the ferromagnetic elements 170. In this way, the separable magnetic connection can be additionally secured.

In addition to the tripod thread 330, recesses 331 can be provided on the underside 302 of the accessory element 300 which are arranged in relation to the tripod thread 330 precisely the same as the countersunk holes 161-164 in relation to the central countersunk hole 132 in the adapter plate 100. Thus, the hot-shoe adapter 200 can also be fastened directly to the accessory element 300 without the adapter plate 100 in a corresponding manner.

Overall a flexible connection system is obtained in which the adapter plate 100, the hot-shoe adapter 200 and a plurality of accessory elements 300 in various combinations can be fastened in various ways to a camera system.

Figure 9:
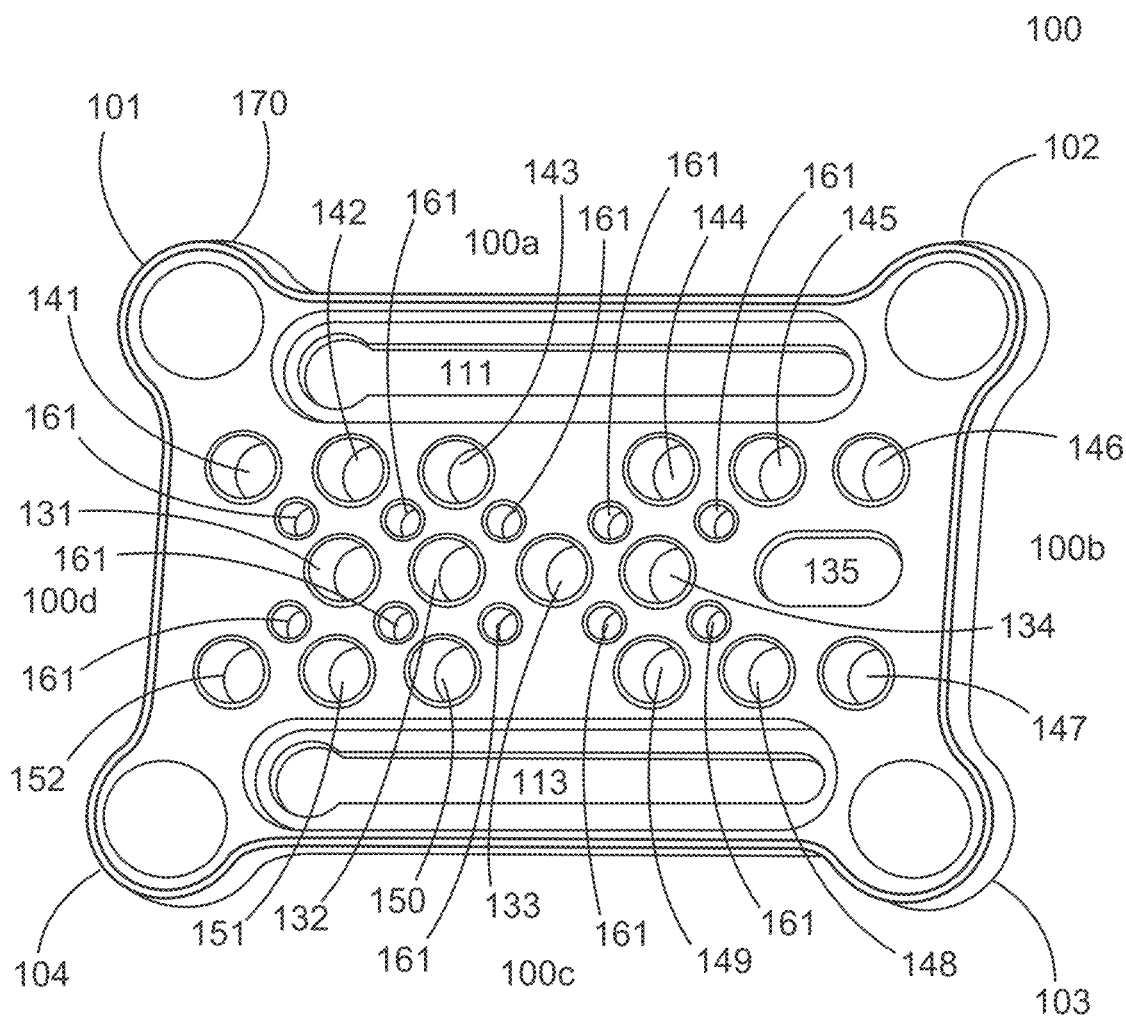
FIG. 9 shows a schematic plan view of an adapter plate according to a second exemplary embodiment.
Figure 10:
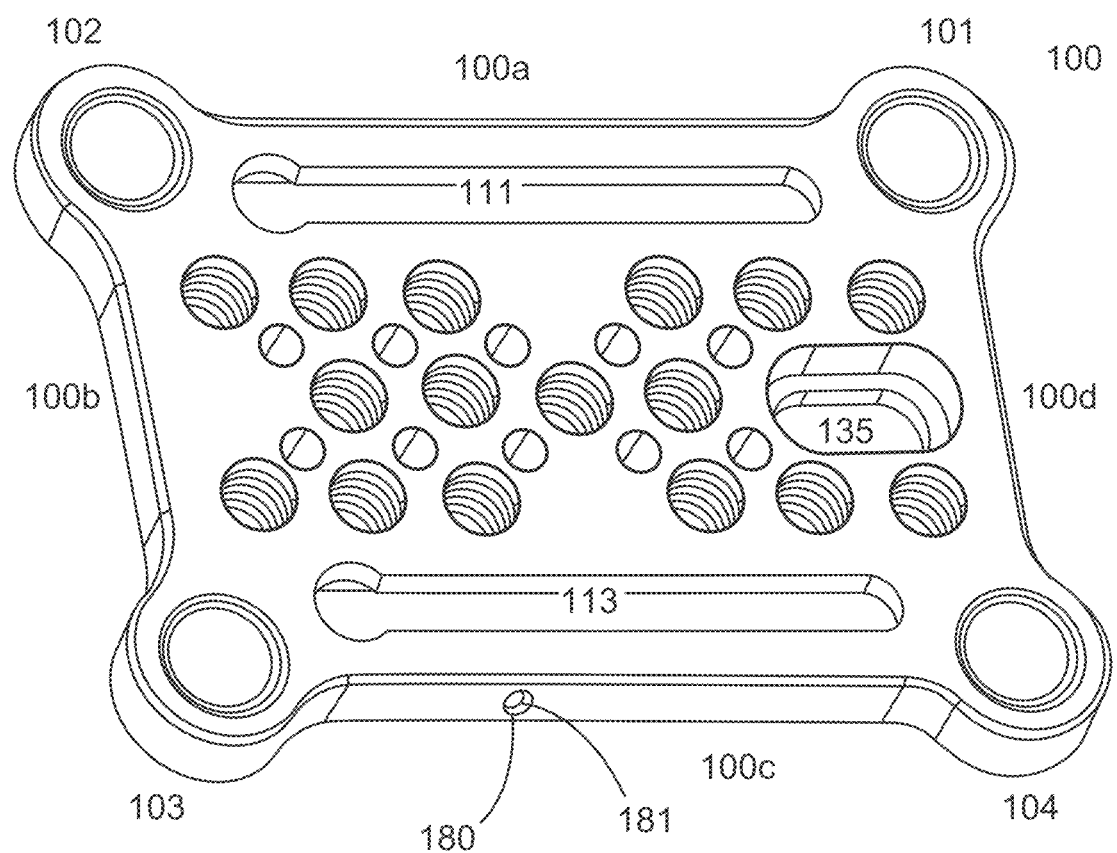
FIG. 10 shows a further schematic plan view of the adapter plate according to the second exemplary embodiment.

FIGS. 9 and 10 each show a schematic view of an adapter plate according to a second exemplary embodiment. The adapter plate 100 has a plurality of holes or countersunk holes or elongate holes or countersunk elongate holes which can be used for mounting a hot-shoe adapter and/or components for a camera or a wireless transmitter. The plate 100 can optionally have a substantially rectangular basic shape with four corners 101, 102, 103, 104 as well as four sides 100a, 100b, 100c, 100d. The plate 100 in this case has two long sides 100a, 100c and two short sides 100b, 100d. Optionally the plate 100 can also be configured as a square, in which case the sides would all be substantially the same length.

Figure 11:
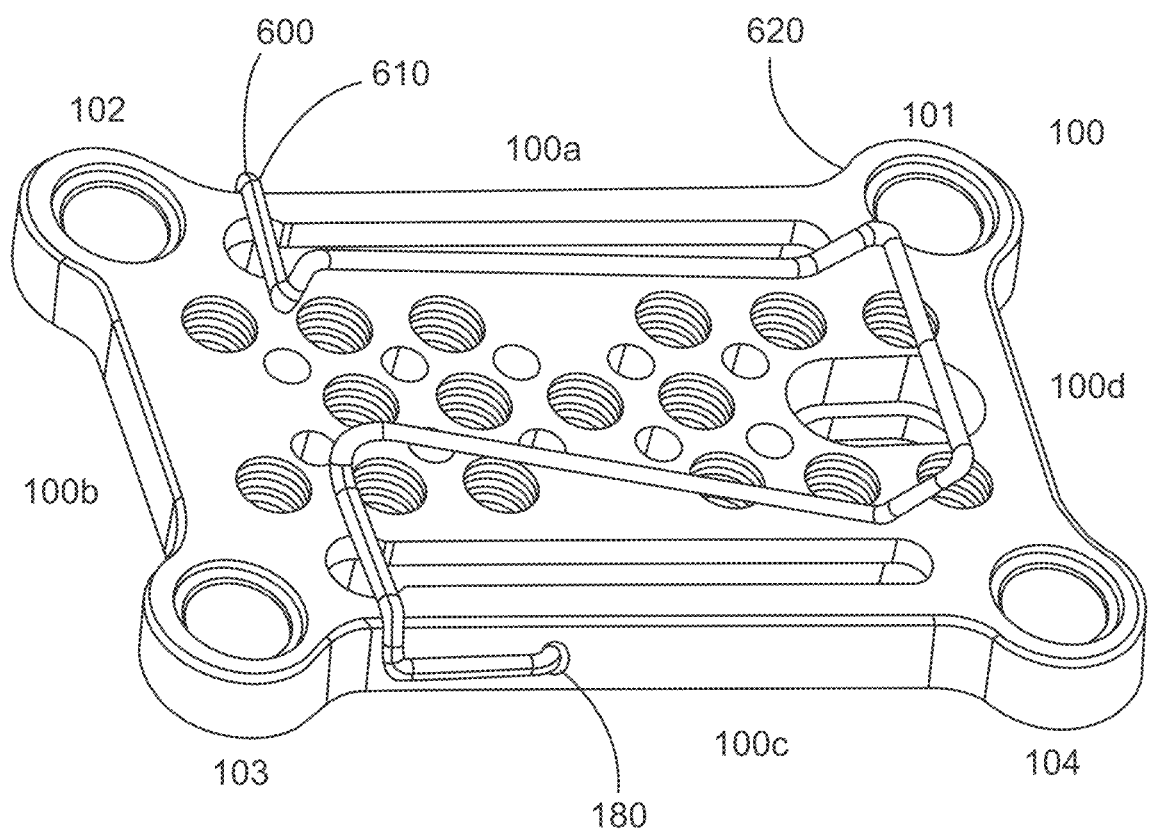
FIG. 11 shows a further schematic plan view of the adapter plate according to the second exemplary embodiment, FIGS. 12A and 12B each show a schematic view of an adapter plate with a hot-shoe adapter.

Two countersunk elongate holes 111, 113 can be provided along the two longer sides 110a, 100c. In the region of the long ends 100a, 100c holes 180 can optionally each be provided with threads 181. These holes 180 with threads 181 serve to receive a bracket 600 (as shown in FIG. 11). The bracket 600 has first ends 610 and a second end 620. The first ends 610 are fixed in the holes 180.

The plate 100 has first holes 131-134 and a first elongate hole 135. These first holes 131-134 are located substantially in the centre between the first and third side 100a, 100c. These first holes can be used to receive screws by means of which accessory parts can be screwed to the adapter plate. The plate 100 further has second holes 161 which are arranged around the first holes 131-134 and can serve to receive a dome of the hot-shoe adapter. Optionally ten second holes 161 are provided. The second holes 161 are arranged so that four first holes 161 are arranged around each of the first holes 131-134. This allows a high flexibility when fastening the hot-shoe adapter to the adapter plate.

The adapter plate 100 further has third holes 141-152. The third holes 141-152 are optionally provided in each case between the first holes and the first elongate hole 111 or between the first holes 161 and the elongate hole 113. Optionally twelve third holes 141-152 are provided in the adapter plate 100. In this case, three third holes 141, 142, 143 can be provided in the region of the fourth side 100d between the elongate hole 111 and the three second holes 161. Furthermore, three further third holes 150-152 can be provided in the region of the fourth side 100d between the elongate hole 113 and three second holes 161. Furthermore, three third holes 144-146 can optionally be arranged in the region of the second side 100b between the elongate hole 111 and the first hole 134 and the elongate hole 135. Furthermore, three third holes 147, 148, 149 can optionally be arranged in the region of the second side 100b between the elongate hole 103 and a first hole 134 and an elongate hole 135.

Countersunk holes 121-124 (third holes) can be provided at the respective four corners 101-104. The countersunk holes 121-124 can optionally have threads in order to be mounted on a tripod, for example. Optionally magnets can be provided in the countersunk holes 121-124. Optionally the magnets can be arranged in the countersunk holes 121-124 such that in each case one recess remains opposite a surface of the adapter plate 101.

FIG. 11 shows a further schematic plan view of the adapter plate according to the second exemplary embodiment. In FIG. 11 the adapter plate according to the second exemplary embodiment is shown together with a retaining bracket 600.

Figure 12A:
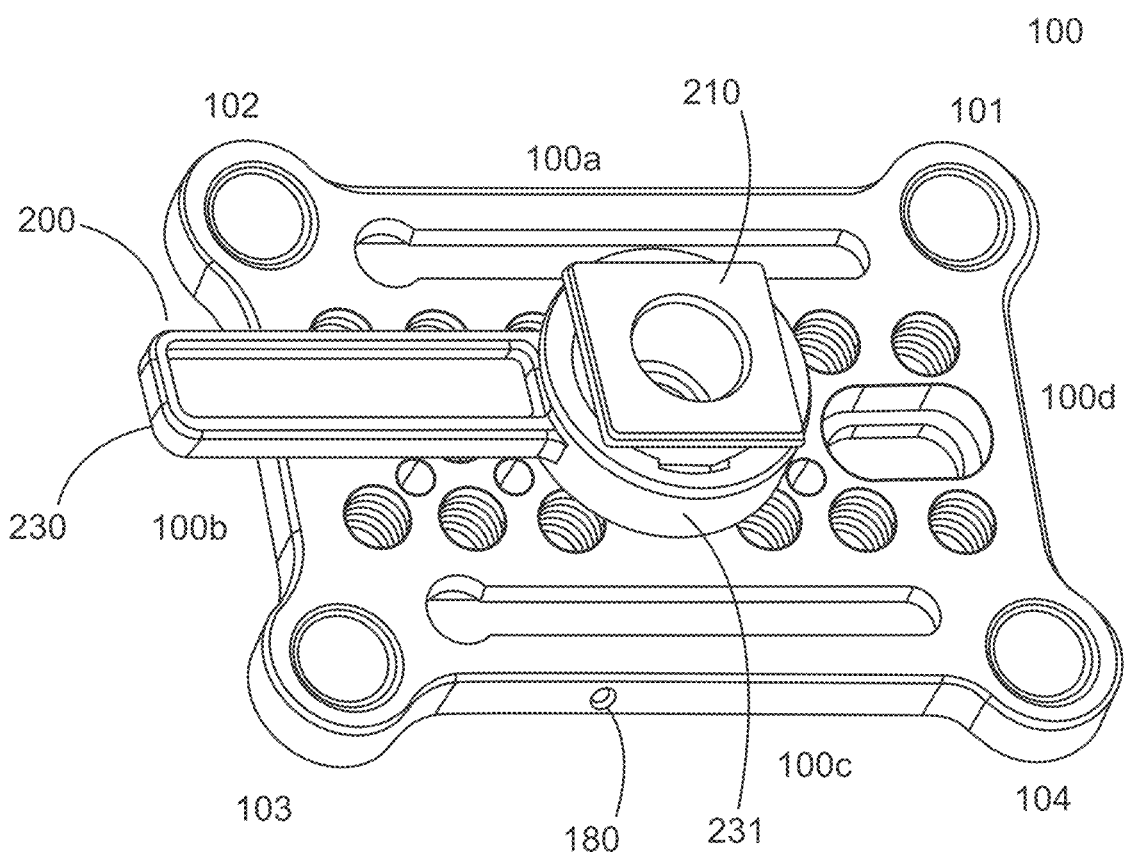
Figure 12B:
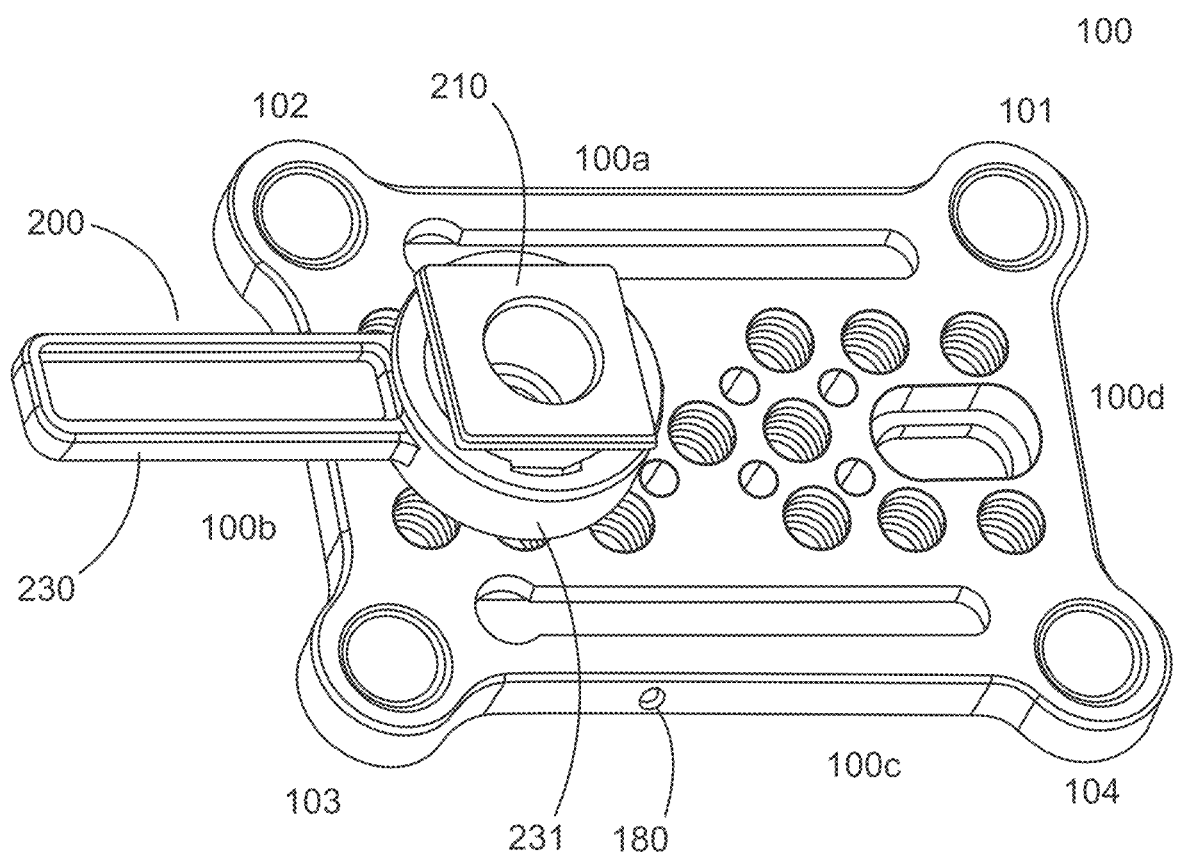

FIGS. 12A and 12B each show a schematic view of an adapter plate with a hot-shoe adapter. FIGS. 12A and 12B each show an adapter plate 100 with a hot-shoe adapter 200, wherein the hot-shoe adapter is mounted in or on the adapter plate 100. As can be seen from FIGS. 12A to 12B, the hot-shoe adapter 200 can be mounted at various positions in or on the adapter plate 100. For this purpose the first holes 131-134 can each be provided with an internal thread. The hot-shoe adapter 200 can then be screwed with the aid of a screw 240 to one of the first holes 131-134 as desired.

Respectively one hole or a bore 180 for receiving the bracket 600 can be provided on the first and third side 100a, 100c.

Figure 13A:
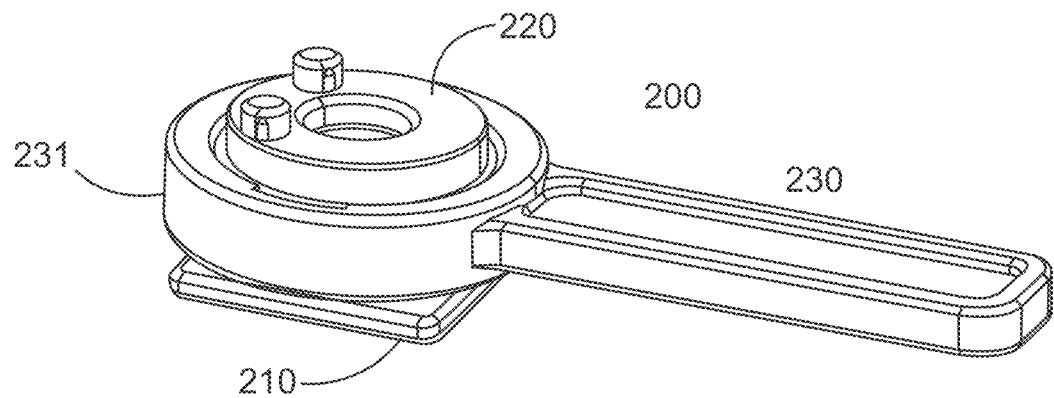
FIG. 13A to 13E show various views of a hot-shoe adapter.
Figure 13B:
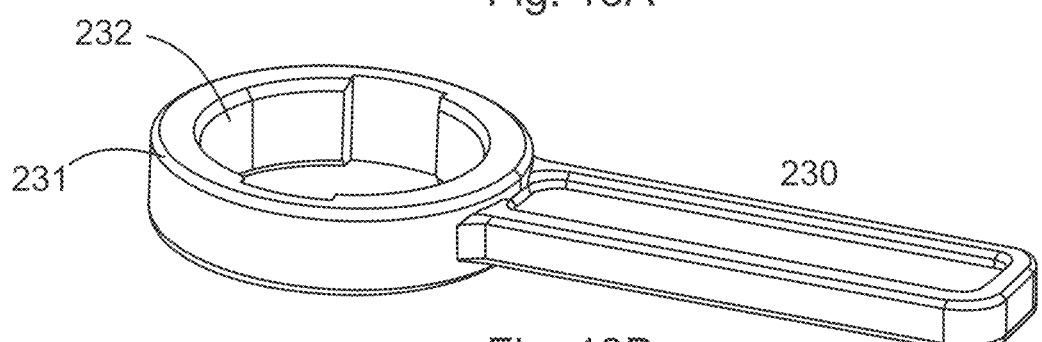
Figure 13C:
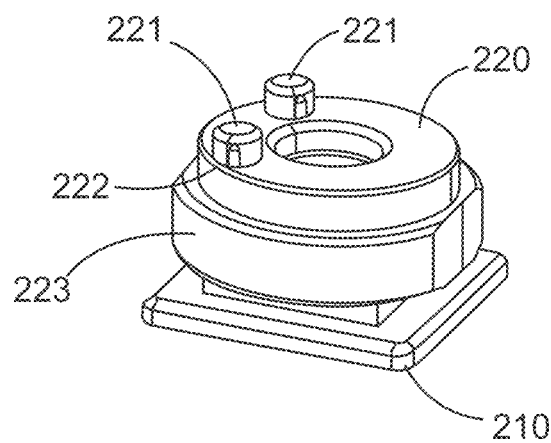
Figure 13D:
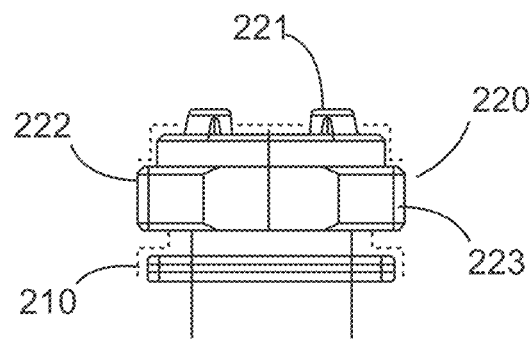
Figure 13E:
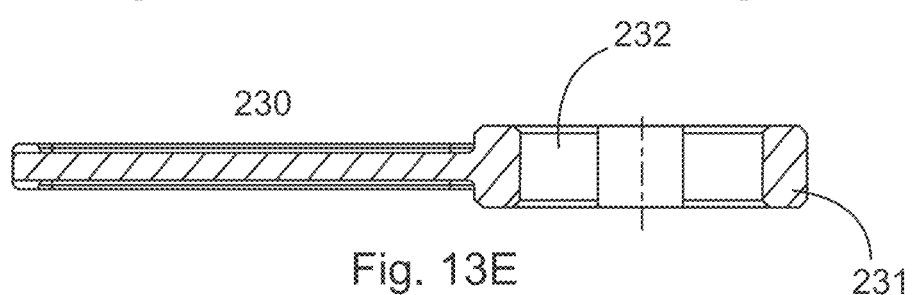

FIGS. 13A to 13E show various views of a hot-shoe adapter. FIG. 13A shows a schematic diagram of the hot-shoe adapter. FIG. 13B shows a lever or handle 230 with an outer element 231. FIG. 13C shows an element of the hot-shoe adapter with a first end 210 for mounting in a hot shoe and a second end 220 for mounting in or on the adapter plate 100. The first end 210 is optionally configured to be rectangular and suitable to be inserted into a hot shoe. Two projections or domes 221 are provided at the second end 220. These domes 221 can be inserted into the second holes 161. Optionally a screw 240 can be provided for mounting the hot-shoe adapter 200. The inner element 222 has an external thread. The outer element 231 has an internal thread which can be screwed onto the external thread of the inner element. The outer element 231 is coupled to the handle or lever 230 by means of which the outer element 231 can be twisted with respect to the inner element 222 so that the outer element 231 on the thread changes its distance from the rectangular first end 210. Thus, a part of the hot shoe can be clamped and therefore reliably fastened between the first end 210 and the outer element 231. The lever 230 serves to perform the rotational movement of the outer element 231 required for clamping tightly. FIG. 13D shows a side view of the inner element 222 and FIG. 13E shows a sectional view of the outer element 231 with the lever 230.

REFERENCE LIST

- 100 Adapter plate
- 100a Long side
- 100b Short side
- 100c Long side
- 100d Short side
- 101 corner
- 102 corner
- 103 corner
- 104 corner
- 111 First countersunk elongate hole
- 112 Second countersunk elongate hole
- 113 Third countersunk elongate hole
- 114 Fourth countersunk elongate hole
- 121 Third hole
- 122 Third hole
- 123 Third hole
- 124 Third hole
- 131 First hole
- 132 First hole
- 133 First hole
- 134 First hole
- 135 Elongate hole
- 141 Fourth hole
- 142 Fourth hole
- 143 Fourth hole
- 144 Fourth hole
- 145 Fourth hole
- 147 Fourth hole
- 148 Fourth hole
- 149 Fourth hole
- 150 Fourth hole
- 151 Fourth hole
- 152 Fourth hole
- 161 Countersunk hole
- 163 Hole
- 170 Magnets
- 180 Hole
- 181 Thread
- 190 Recesses
- 200 Hot-shoe adapter
- 210 First end
- 220 Second end
- 221 Domes
- 222 Inner element
- 223 External thread
- 230 Handle
- 231 External element
- 232 Internal thread
- 240 Screw
- 300 Receiver
- 301 Upper side
- 302 Underside
- 310 Domes
- 311 Elements
- 320 Recesses
- 321 Magnet unit
- 330 Tripod thread insert
- 331 Recesses
- 500 Digital camera
- 600 Bracket
- 610 First end
- 620 Second end
- 700 Pivot arm

The invention claimed is:

1. A hot-shoe adapter system for fastening accessory parts to a hot shoe, comprising:
a hot-shoe adapter with a first side for fastening in a hot shoe and a second side, and
an adapter plate, which comprises a plurality of first holes for fastening the hot-shoe adapter, a plurality of second holes for fastening the second side of the hot-shoe adapter, four corners each having a third hole and at least one magnetic element in the region of the third holes.

2. An adapter system according to claim 1, wherein the adapter plate has a plurality of fourth holes for accommodating attachment components.

3. An adapter system according to claim 1, wherein the adapter plate has four side surfaces and at least first and second longitudinal holes or elongate holes in the region of the four side surfaces.

4. An adapter system according to claim 3, wherein the adapter plate has at least one hole in or on at least two of the side surfaces.

5. An adapter system according to one of claim 1, wherein the hot-shoe adapter has at least two domes on its second side, whose external diameter is matched to an internal diameter of the second holes so that the domes can be inserted into the second holes.

6. An adapter system according to claim 1, wherein the hot-shoe adapter has an inner element with an external thread and an outer element screwed thereon with an internal thread,
wherein due to a rotary movement between the inner element and the outer element a part of the hot shoe can be tightly clamped between the first end of the inner element and the outer element.

7. An adapter system according to claim 6, wherein the outer element is provided with a lever and wherein the pitch of the internal thread and the external thread are provided so that tight clamping on the hot shoe is possible without a complete rotation of the outer element.

8. An adapter plate for fastening accessory parts to a hot shoe comprising:
   a plurality of first holes, four corners each having a third hole and at least one magnetic element in the region of the third holes.

9. An adapter plate according to claim 8, further comprising a plurality of fourth holes for accommodating attachment components.

10. An adapter plate according to claim 8, further comprising four side surfaces and a plurality of first and second longitudinal holes in the region of the four side surfaces.

\* \* \* \* \*